US008069598B2

(12) United States Patent
Garcia et al.

(10) Patent No.: US 8,069,598 B2
(45) Date of Patent: Dec. 6, 2011

(54) ADJUSTABLE DISPLAY BOARD SYSTEM

(76) Inventors: Jorge Garcia, Independance, MO (US); Sam Minnich, Kansas City, KS (US)

( * ) Notice: Subject to any disclaimer, the term of this patent is extended or adjusted under 35 U.S.C. 154(b) by 896 days.

(21) Appl. No.: 12/108,142

(22) Filed: Apr. 23, 2008

(65) Prior Publication Data

US 2009/0266778 A1 Oct. 29, 2009

(51) Int. Cl.

| | |
|---|---|
| ***G09F 7/00*** | (2006.01) |
| ***A47F 1/00*** | (2006.01) |
| ***E04G 3/00*** | (2006.01) |
| ***E04G 5/06*** | (2006.01) |
| ***F16M 11/00*** | (2006.01) |
| ***F16M 11/24*** | (2006.01) |
| ***E06B 7/28*** | (2006.01) |
| ***E04G 3/20*** | (2006.01) |
| ***A47B 47/00*** | (2006.01) |
| ***A47B 57/00*** | (2006.01) |
| ***G03B 21/14*** | (2006.01) |

(52) U.S. Cl. .................. 40/601; 40/611.05; 248/295.11; 248/292.11; 248/157; 248/422; 248/423; 248/188.2; 248/207; 248/222.11; 248/221.12; 248/243; 248/244; 248/477; 211/201; 211/200; 211/195; 353/69; 353/70; 353/119; 312/306; 312/312; 312/247; 108/145; 108/146

(58) Field of Classification Search .................... 40/601, 40/611.05; 248/295.11, 292.12, 157, 422, 248/423, 188.2, 207, 222.11, 221.12, 243, 248/244, 477; 211/201, 200, 195; 353/69, 353/70, 119; 312/306, 312, 247; 108/145, 108/146

See application file for complete search history.

(56) References Cited

U.S. PATENT DOCUMENTS

| | | | |
|---|---|---|---|
| 579,767 | A | 3/1897 | Mushoff |
| 604,422 | A | 5/1898 | Schneider et al. |
| 736,431 | A | 8/1903 | Opitz |
| 885,241 | A | 4/1908 | Grant |
| 2,161,587 | A | 6/1939 | Pettis |
| 2,528,311 | A | 10/1950 | Hurley |
| 2,761,640 | A | 9/1956 | Frater |
| 2,825,152 | A | 3/1958 | Babylon |
| 2,987,832 | A | 6/1961 | Urbain et al. |
| 3,107,442 | A | 10/1963 | Levine |
| 3,261,113 | A | 7/1966 | March |
| 3,531,898 | A | 10/1970 | Facemire |
| 3,550,291 | A | 12/1970 | Albright |
| 3,914,890 | A | 10/1975 | Behlen, Jr. |
| 4,536,163 | A | 8/1985 | Schnirch et al. |
| 5,067,287 | A | 11/1991 | Lewis |

(Continued)

*Primary Examiner* — Joanne Silbermann
*Assistant Examiner* — Syed A Islam
(74) *Attorney, Agent, or Firm* — Hovey Williams LLP

(57) ABSTRACT

An adjustable display board system comprises a display board, first and second grippers, first and second racks, and a handle. The first and second grippers are coupled to the display and include a plurality of teeth. The first and second racks are mounted to a rigid structure and include a plurality of teeth generally greater than the number of teeth of the first and second grippers. The teeth of the first and second grippers mesh with the teeth of the first and second racks to maintain the vertical position of the display board. The handle is pushed to disengage the grippers from the racks and allow vertical motion of the display board. The adjustable display board system also comprises a display board, a linear actuator unit, and one or more pivot arms. The linear actuator unit includes a movable actuator rod and is coupled to the one or more pivot arms, which in turn is coupled to the display board. Motion of the actuator rod is converted to raising and lowering of the display board.

9 Claims, 8 Drawing Sheets

U.S. PATENT DOCUMENTS

| | | | | |
|---|---|---|---|---|
| 6,139,331 | A | 10/2000 | Owen | |
| 6,302,543 | B1 * | 10/2001 | Arai et al. | 353/70 |
| 6,540,094 | B1 | 4/2003 | Baloga et al. | |
| 2005/0191611 | A1 | 9/2005 | Owen et al. | |

* cited by examiner

ADJUSTABLE DISPLAY BOARD SYSTEM

BACKGROUND OF THE INVENTION

1. Field of the Invention

Embodiments of the present invention relate to display boards, such as erasable white boards. More particularly, embodiments of the present invention relate to position-adjustable display boards.

2. Description of the Related Art

A board for displaying information, such as a white board, is routinely mounted to a wall in a fixed position. The board may be hung with brackets, or other mounting components, rigidly attached to the wall that keep the board positioned at a constant height from the floor. The board may be placed at what is considered to be a nominal height that is convenient for many people. However, the board may be positioned at too great a height for shorter people to easily reach all areas of the board. On the other hand, the board may be placed to low for taller people to comfortably reach the lower portions of the board.

SUMMARY OF THE INVENTION

Embodiments of the present invention provide a distinct advance in the art of boards for displaying information. More particularly, embodiments of the invention provide a display board system that is easily adjustable to a desired and convenient height.

In a first embodiment, the display board system comprises a display board, first and second grippers, first and second racks, and a handle. The first and second grippers each include a plurality of sawtooth teeth and are coupled with the left and right sides of the display board, respectively. The first and second racks each include a plurality of sawtooth teeth that are complemental to the sawtooth teeth of the first and second grippers. The first rack is mounted to a rigid structure near the left side of the display board and the sawtooth teeth of the first gripper engage with at least a portion of the sawtooth teeth of the first rack. The second rack is mounted to the rigid structure near the right side of the display board and the sawtooth teeth of the second gripper engage with at least a portion of the sawtooth teeth of the second rack. The engagement of the first gripper teeth with the first rack teeth and the second gripper teeth with the second rack teeth is such that it prevents downward motion of the display board, while allowing upward motion. The handle is coupled to the first and second grippers through a crosspiece and spring combination that maintains engagement of the first and second grippers with the first and second racks respectively. When the handle is pushed, the first and second grippers are disengaged from the first and second racks, allowing the display board to be lowered.

In a second embodiment, the display board system comprises a display board, a first travel guide, a second travel guide, and a linear actuator unit. The first travel guide is elongated and mounted vertically near the left side of the display board to a rigid structure. The second travel guide is elongated and mounted vertically near the right side of the display board to the rigid structure. The first and second travel guides in combination guide the display board. The linear actuator unit is mounted to the rigid structure and includes a motor drive unit and an actuator rod. The display board is coupled to the actuator rod. The motor drive unit drives the actuator rod to extend and retract, thereby lowering the board upon extension and raising the board upon retraction.

In a third embodiment, the display board system comprises a display board, a linear actuator unit, and a pivot arm. The linear actuator unit is pivotally mounted to a rigid structure and includes a motor drive unit that drives an actuator rod to extend and retract. The pivot arm is pivotally mounted to the rigid structure and is coupled to both the actuator rod and the display board. The pivot arm translates the retraction of the actuator rod into raising of the display board and the extension of the actuator rod into lowering of the board.

In a fourth embodiment, the display board system comprises a display board, a linear actuator unit, and a pivot arm. The linear actuator unit is pivotally mounted to a rigid structure and includes a motor drive unit that drives an actuator rod to extend and retract. The pivot arm is pivotally mounted to the rigid structure and includes a lever coupled to the actuator rod that is positioned on one side of the pivot point and a bar coupled to the bearing track that is positioned on the other side of the pivot point, such that the motion of the lever is counter to the motion of the bar. The pivot arm translates the extension of the actuator rod into lowering of the display board and the retraction of the actuator rod into raising of the board.

In a fifth embodiment, the display board system comprises a display board, a linear actuator unit, a first pivot arm, and a second pivot arm. The linear actuator unit is pivotally mounted to a rigid structure and includes a motor drive unit that drives an actuator rod to extend and retract. The first pivot arm is slidably coupled to the actuator rod and includes a first end that is pivotally mounted to the rigid structure. The second pivot arm is slidably coupled to the drive motor unit and includes a first end that is pivotally mounted to the rigid structure. The first and second pivot arms in combination translate the extension of the actuator rod into raising of the display board and the retraction of the actuator rod into lowering of the board.

In a sixth embodiment, the display board system comprises a display board, a linear actuator unit, a first pivot arm, a second pivot arm, a third pivot arm, and a fourth pivot arm. The linear actuator unit is pivotally mounted to a rigid structure and includes a motor drive unit that drives an actuator rod to extend and retract. The first pivot arm is slidably coupled to the motor drive unit. The second pivot arm is slidably coupled to the actuator rod, pivotally coupled to the first pivot arm, and pivotally coupled to the display board. The third pivot arm is pivotally coupled to the second pivot arm and pivotally connected to the display board. The fourth pivot arm is pivotally coupled to third pivot arm and pivotally connected to the first pivot arm. The first pivot arm, the second pivot arm, the third pivot arm, and the fourth pivot arm in combination translate the motion of the linear actuator unit into raising and lowering of the display board.

In various embodiments, the display board system also includes a receiver to receive commands to raise the display board and to lower the display board. The display board system further includes a frame to which the display board is releasably coupled.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

Figure 1:
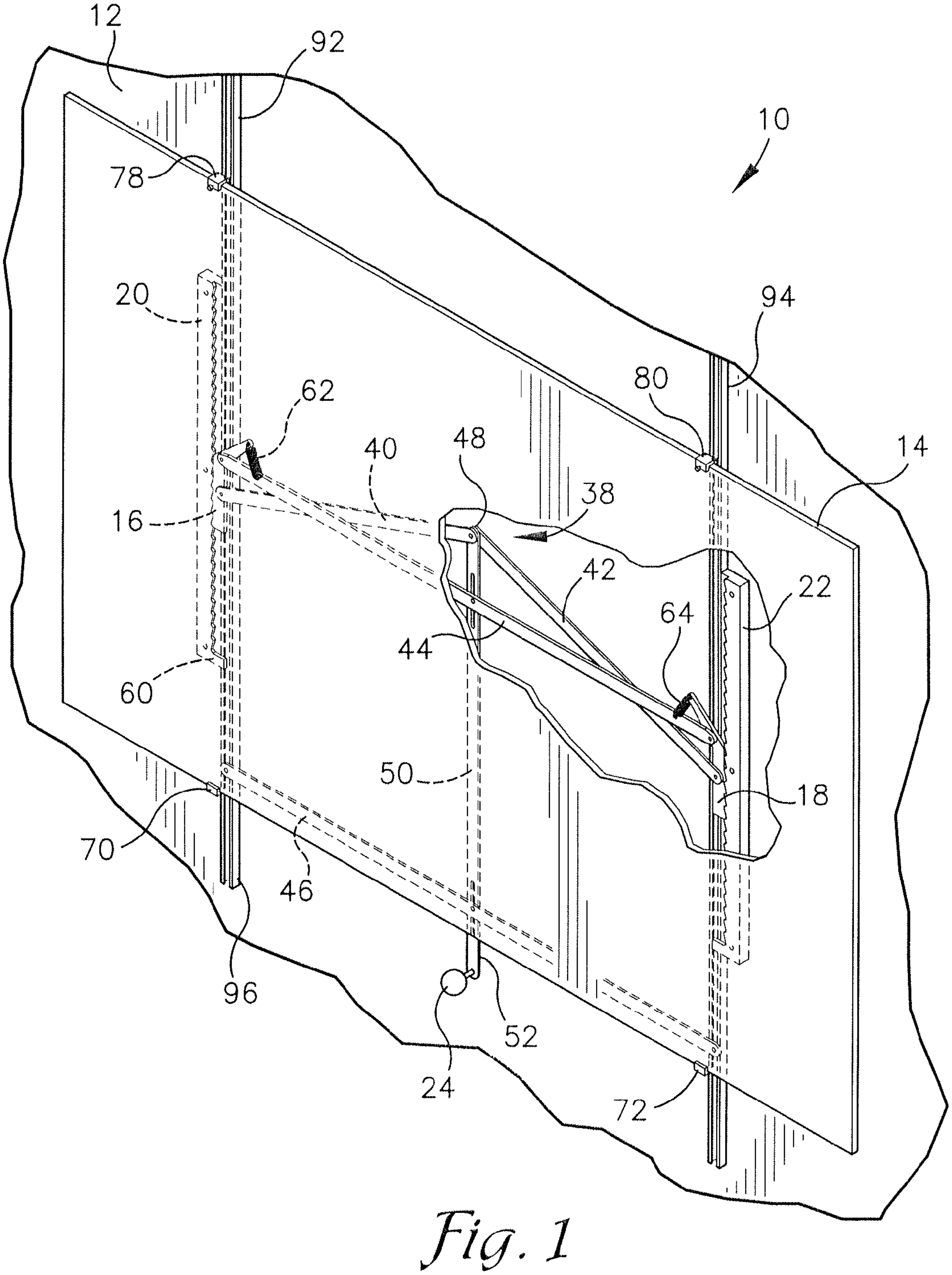
FIG. 1 is a perspective view of an adjustable display board system constructed in accordance with a first embodiment of the current invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIGS. 1-10 show an adjustable display board system 10 constructed in accordance with various embodiments of the present invention. The display board system 10 may be utilized in locations where individuals need to convey information to other individuals or groups—such as schools, libraries, churches, meeting halls, civic or government buildings, business settings, such as board rooms or strategy rooms, and the like. The display board system 10 may be mounted to a rigid structure 12 that will support the weight of the system 10. Typically, the rigid structure 12 is a wall, although other structures are possible, such as a door.

Figure 4:
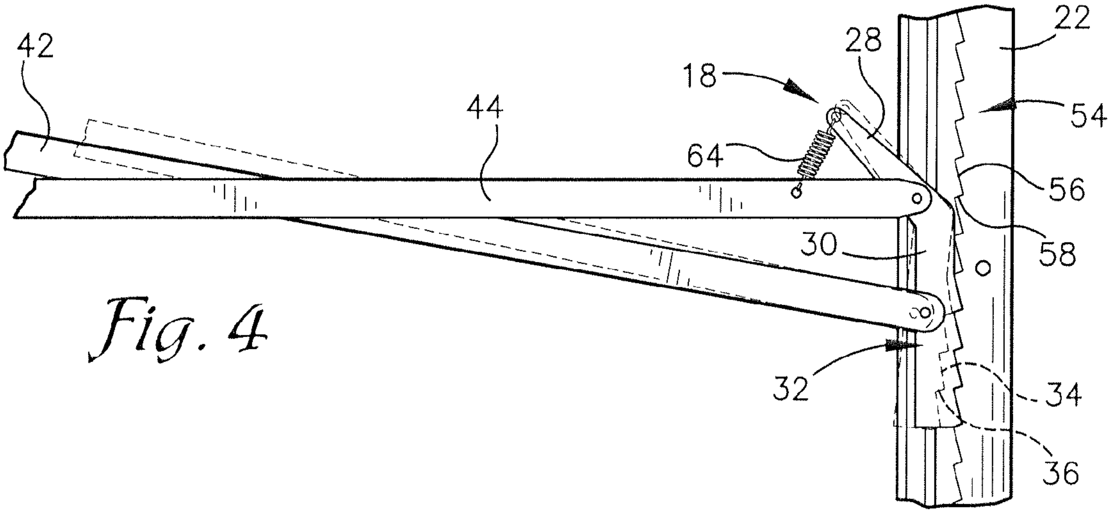
FIG. 4 is a front view showing a portion of the adjustable display board system featuring a gripper and a portion of a rack.

A first embodiment of the system 10 is shown in FIGS. 1 and 4, and may comprise a display board 14, a first gripper 16, a second gripper 18, a first rack 20, a second rack 22, a handle 24, and a frame 26.

The display board 14 may be any device capable of displaying information. In preferred embodiments, the display board 14 is a dry-erase or dry-wipe board, commonly known as a white board. Generally the front surface is a glossy white to easily display a wide range of colors made with non-permanent markers. Thus, information may be written on the display board 14 with the non-permanent markers. The information may also easily be erased. The display board 14 may be constructed from polyester-coated or enameled steel, which allows magnets in shape of characters, numbers, or other informative material to be affixed to the display board 14. In general, the display board 14 may also include any board for displaying information, such as chalkboards, bulletin boards, display cases, tackboards, notice boards, letter boards, cork boards, and the like.

The first and second grippers 16, 18 engage with the first and second racks 20, 22, respectively. Each gripper 16, 18 may include two elongated portions—a lever 28 and a bar 30—located at opposing ends of the gripper. The lever 28 is generally shorter in length than the bar 30 and may be coupled to the bar 30 at an angle between 0° and 118°. Typically, the angle is approximately 45°. The bar 30 may include a plurality of teeth 32 protruding outward from the side opposite from the lever 28. The teeth 32 are generally of a sawtooth shape, which may include a repeated pattern of teeth that rise slowly and fall sharply, such that each tooth includes a long edge 34 that points in a nearly vertical direction and a short edge 36 that points in a nearly horizontal direction. The long edge 34 is angled slightly inward from the vertical, and the short edge 36 is angled slightly downward from the horizontal. Each gripper 16, 18 may include between three and eight sawtooth teeth 32.

The first gripper 16 may be pivotally coupled with the left side of the rear of the display board 14 approximately midway between the bottom and the top of the board 14, wherein the left side is to the left when facing the front of the display board 14. The pivot point between the first gripper 16 and the display board 14 is close to where the lever 28 joins the bar 30. The second gripper 18 may be pivotally coupled to the right side of the rear of the display board 14 in a similar vertical location and with a similar pivot point as the first gripper 16, wherein the right side is to the right when facing the front of the display board 14. Generally, the first and second grippers 16, 18 are located and oriented symmetrically with respect to a vertical center line of the display board 14.

The first and second grippers 16, 18 may also be rotatably coupled to a first crosspiece 38 approximately midway along the length of the bar 30 of each gripper 16, 18. The first crosspiece 38 is positioned generally horizontally behind the display board 14. The first crosspiece 38 may be formed from two half-length subpieces 40, 42 wherein one end of a first subpiece 40 is rotatably joined to one end of a second subpiece 42. The two subpieces 40, 42 may be joined at an angle between 90° and 180°, where the angle is typically approximately 135°. Alternatively, the first crosspiece 38 may be formed from a single flexible piece of hardened material that is bent in the middle of its length at approximately 135°.

The first crosspiece 38 may be rotatably coupled to an upper end 48 of a vertical bar 50 near the midpoint of the first crosspiece 38. The vertical bar 50 may be also be slidably coupled to second and third crosspieces 44, 46 that are each attached horizontally to the frame 26. The second crosspiece 44 is positioned approximately midway between the top and the bottom of the frame 26. The third crosspiece 46 is positioned near the bottom of the frame 26. The second and third crosspieces 44, 46 both provide guidance for the vertical bar 50 while the vertical bar 50 is in motion.

The vertical bar 50 may be coupled to the handle 24 at a lower end 52 of the vertical bar 50. The vertical bar 50 is dimensioned such that the lower end 52 of the vertical bar 50 protrudes from the bottom of the display board 14. Thus, the handle 24 is accessible below the bottom of the display board 14. The handle 24 may be of any size and shape that is easily-gripped and securely-held by the hand and is easily pushed or pulled upward. The handle 24 may include a knob, such as a doorknob, or a pull handle, such as a handle for a drawer, or variations thereof.

The first rack 20 may be mounted to the rigid structure 12 near the left edge of the board 14. The second rack 22 may be mounted to the rigid structure 12 near the right edge of the board 14, generally in horizontal alignment with the first rack 20. The first and second racks 20, 22 are generally elongated and each rack 20, 22 may include a plurality of sawtooth-shaped teeth 54 aligned along one side of the rack that are generally complemental to the teeth 32 of the first and second grippers 16, 18, wherein each tooth 54 includes a long edge 56 that points in a nearly vertical direction and a short edge 58 that points in a nearly horizontal direction. Additionally, the long edge 56 is angled slightly inward from the vertical, and the short edge 58 is angled slightly downward from the horizontal. Each rack 20, 22 generally includes many more teeth 54 than each gripper 16, 18 in order to allow each gripper 16, 18 to move over a wide range with respect to each rack 20, 22. Each rack 20, 22 may include between twenty-five and fifty teeth. In addition, each rack 20, 22 includes an extended tab 60 at the bottom end of each rack 20, 22 to prevent travel of the first and second grippers 16, 18 beyond the bottom of the first and second racks 20, 22.

The first and second racks 20, 22 may be oriented symmetrically about a vertical centerline of the display board 14 such that the teeth 54 of the first rack 20 face the teeth 54 of the second rack. Thus, when the system 10 is installed, the teeth 32 of the first and second grippers 16, 18 may mesh with the teeth 54 of the first and second racks 20, 22, respectively. The short edge 36 of the gripper teeth 32 engages the short edge 58 of the rack teeth 54 and the long edge 34 of the gripper teeth 32 engages the long edge 56 of the rack teeth 54.

The first and second grippers 16, 18 may be coupled to first and second springs 62, 64, respectively. Each spring 62, 64 is connected at one end to the lever 28 of each rack 20, 22 and at the other end to the second crosspiece 44. Each spring tends to pull the lever 28 of each gripper 16, 18 inward toward the center of the display board 14, which in turn causes a pivot of each gripper 16, 18 about its pivot point that pushes the bar 30 of each gripper 16, 18 outward away from the center. The outward force on the bar 30 of each gripper 16, 18 pushes the teeth 32 of the first and second grippers 16, 18 against the teeth 54 of the first and second racks 20, 22, respectively. The horizontal portion of the gripper teeth 32 are supported by the horizontal portion of the rack teeth 54 to prevent downward motion of the display board 14 with respect to the first and second racks 20, 22. However, upward motion of the display board 14 is possible by pushing upward on the display board 14. An upward force on the display board 14 generally causes the horizontal portion of the gripper teeth 32 to separate from the horizontal portion of the rack teeth 54 and causes the vertical portion of the gripper teeth 32 to slide upward and inward against the teeth 54 of the rack. This sliding motion continues until the bottom edge of the gripper teeth 32 passes above the top edge of the rack teeth 54, at which time the tension of the first and second springs 62, 64 causes an outward motion of the first and second grippers 16, 18 against the first and second racks 20, 22, respectively, such that the teeth 32 of the grippers 16, 18 reengage with the teeth 54 of the racks 20, 22. If the upward force is removed, the display board 14 remains in the new position, one level of teeth 54 higher than it was before. Otherwise, the upward motion of the display board 14 continues with the gripper teeth 32 sliding upward and inward against the rack teeth 54 repeatedly until the upward force is removed and the two sets of teeth 32, 54 reengage to maintain the new elevated position of the board 14.

The display board 14 may be lowered by pushing upward on the handle 24. An upward force on the handle 24 in turn exerts an upward force on the vertical bar 50 which in turn exerts an upward force on the first crosspiece 38. When the first crosspiece 38 is pushed upward in the center, the outer ends of the first and second subpieces 40, 42 are pulled inward, which in turn pulls the bar portions 30 of the first and second grippers 16, 18 inward. At this point, the first and second grippers 16, 18 disengage from the first and second racks 20, 22, respectively. This disengagement is made easier by the slight downward angling of the horizontal portions of the rack teeth 54 and the gripper teeth 32. When disengaged, the gripper teeth 32 are completely separated from the rack teeth 54, providing full clearance between the first and second grippers 16, 18 and the first and second racks 20, 22 to allow motion of the display board 14 either upward or downward. However, pushing the handle 24 to disengage the grippers 16, 18 is required for and primarily used for lowering of the display board 14.

Figure 2:
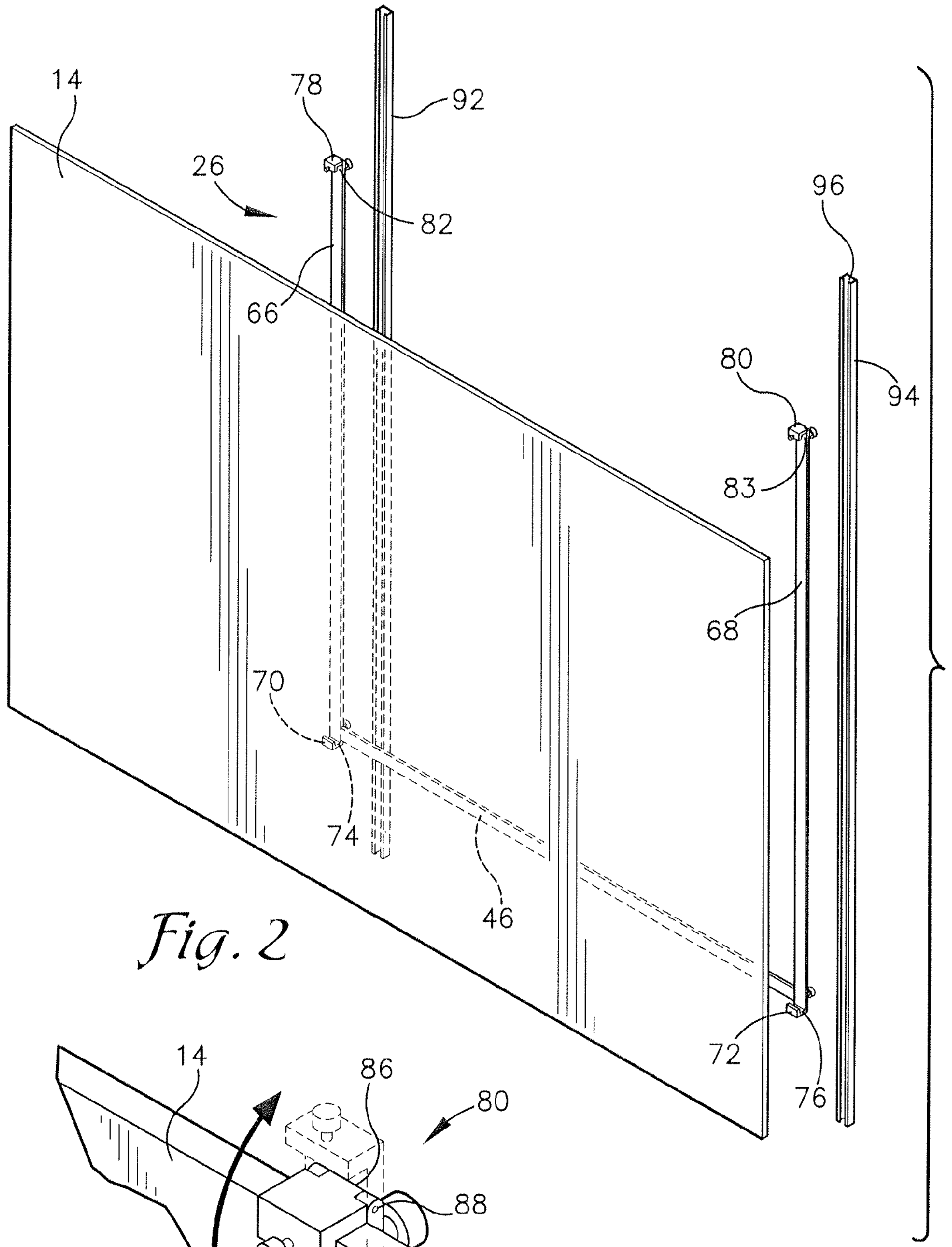
FIG. 2 is a perspective view of a portion of the adjustable display board system featuring a frame to releasably retain a display board.
Figure 3:
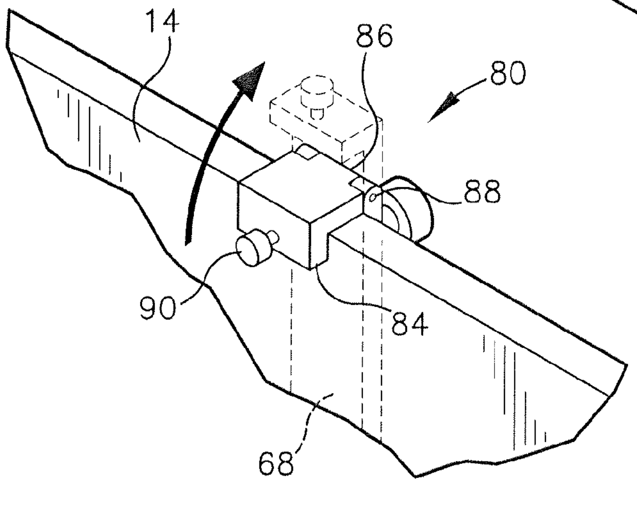
FIG. 3 is an enlarged view of a portion of the frame featuring a frame bar, a bracket, and a trough.

The frame 26, shown in FIGS. 2 and 3, may include a plurality of frame bars and a plurality of brackets. The frame bars may include a first frame bar 66 and a second frame bar 68, each elongated and oriented vertically. Attached to the lower ends of the first frame bar 66 and the second frame bar 68 are a first bracket 70 and a second bracket 72, respectively. The first bracket 70 includes a U-shaped first trough 74 and the second bracket 72 includes a U-shaped second trough 76. The opening of both the first and second troughs 74, 76 may be wider than the thickness of the display board 14 and is generally pointed upward to receive the bottom edge of the display board 14. Attached to the upper ends of the first frame bar 66 and the second frame bar 68 are a third bracket 78 and a fourth bracket 80, respectively. The third bracket 78 includes a U-shaped third trough 82 with a front portion 84, a rear portion 86, and a hinge 88. The fourth bracket 80 includes a U-shaped fourth trough 83 with a front portion 84, a rear portion 86, and a hinge 88. The opening of the third and fourth troughs 82, 83 may be wider than the thickness of the display board 14 and is generally pointed downward. The hinge 88 of both the third trough 82 and the fourth trough 83 rotatably couples the front portion 84 to the rear portion 86. The rear portion 86 of the third and fourth brackets 78, 80 is coupled to the upper end of the first and second frame bars 66, 68 such that the rear portion 86 faces the rigid structure. The front portion 84 of the third and fourth brackets 78, 80 generally faces away from the rigid structure and may be rotated about the hinge 88 to install or uninstall the display board 14.

The display board 14 may be installed to the frame 26 by rotating the front portion 84 of the third and fourth troughs 82, 83 upward and toward the rear portion 86 of the third and fourth troughs 82, 83 to create an open space in the third and fourth brackets 78, 80. The bottom edge of the display board 14 may be placed in the first and second troughs 74, 76. The top edge of the display board 14 may be placed against the rear portion 86 of the third and fourth troughs 82, 83. The front portion 84 of the third and fourth troughs 82, 83 may then be rotated forward over the top edge of the display board 14 until the front portion 84 of the third and fourth troughs 82, 83 comes into contact with the upper portion of the display board 14. The third and fourth brackets 78, 80 may include one or more screws 90 to be screwed into the display board 14 to securely fasten the display board 14 to the frame 26. The third and fourth brackets 78, 80 may include other fastening components that secure the display board 14 to the frame 26. To uninstall the display board 14 from the frame 26, the screws 90 are unscrewed from the display board 14 and the front portion 84 of the third and fourth troughs 82, 83 is rotated upward and away from the display board 14. The display board 14 may be pulled away from the rigid structure slightly and lifted out of the first and second troughs 74, 76.

The second crosspiece 44 may be coupled to the first and second frame bars 66, 68 near the middle of each frame bar. The third crosspiece 46 may be coupled to the first and second frame bars 66, 68 near the lower end of each frame bar. In various embodiments, the frame 26 may include a crosspiece such as the second or third crosspiece 44, 46 to provide stability and mechanical strength for the frame 26.

The display board system 10 may also include a first travel guide 92 and a second travel guide 94. Each travel guide 92, 94 is mounted vertically to the rigid structure 12 and includes an elongated groove or track 96. The first travel guide 92 is positioned on the left side of the display board 14 in proximity to the first rack 20, and the second travel guide 94 is positioned on the right side of the display board 14 in proximity to the second rack 22. The first travel guide 92 may be slidably coupled to the first frame bar 66. The second travel guide 94 may be slidably coupled to the second frame bar 68. Thus, the first and second frame bars 66, 68 generally slide up and down within the first and second travel guides 92, 94, respectively.

The frame 26 and the first and second travel guides 92, 94 may be included in the various embodiments of the adjustable display board system 10 as disclosed herein.

Figure 5:
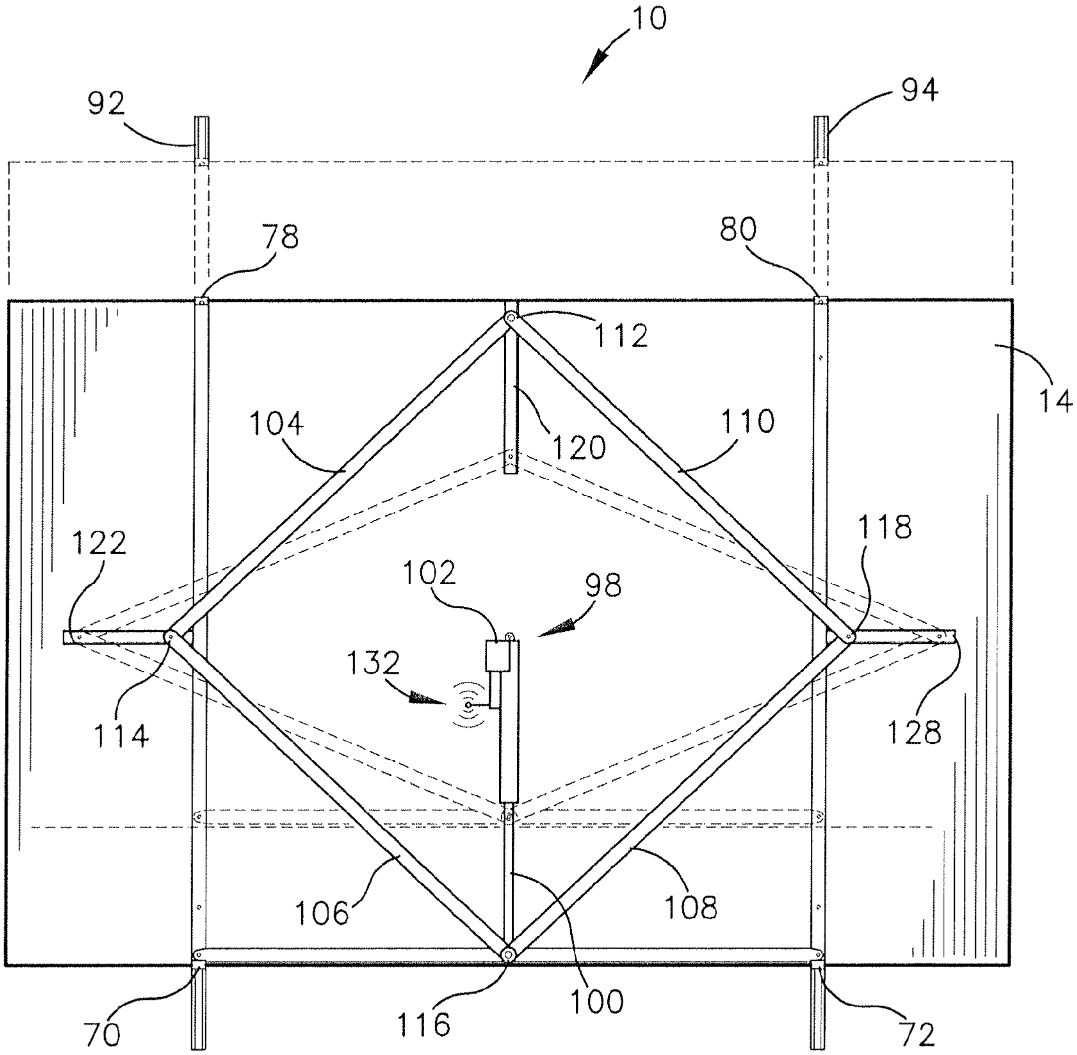
FIG. 5 is a front view of a second embodiment of the adjustable display board system.

A second embodiment of the display board system 10 is illustrated in FIG. 5. The system 10 may comprise the display board 14, the frame 26, the first and second travel guides 92, 94, and a linear actuator unit 98.

The display board 14, the frame 26, and the first and second travel guides 92, 94 are substantially similar to the elements described above.

The linear actuator unit 98 may be fixedly mounted to the rigid structure 12 and may be generally positioned behind the display board 14. The linear actuator unit 98 may include an actuator rod 100 and a motor drive unit 102. The actuator rod 100 is generally elongated and may include grooves, teeth, cogs, or other features that allow the actuator rod 100 to be extended and retracted from the linear actuator unit 98 in a linear fashion. The motor drive unit 102 may include an electric motor, such as an AC motor, a DC motor, a synchronous motor, a stepper motor, and the like, or combinations thereof. The motor drive unit 102 generally provides rotational drive and may be coupled with the actuator rod 100 in such a way as to convert the rotational motion of the motor drive unit 102 into the linear motion of the actuator rod 100. The linear actuator unit 98 may receive electric power from a standard AC voltage source, such as a wall outlet, or from a DC voltage source, such as batteries.

Figure 6:
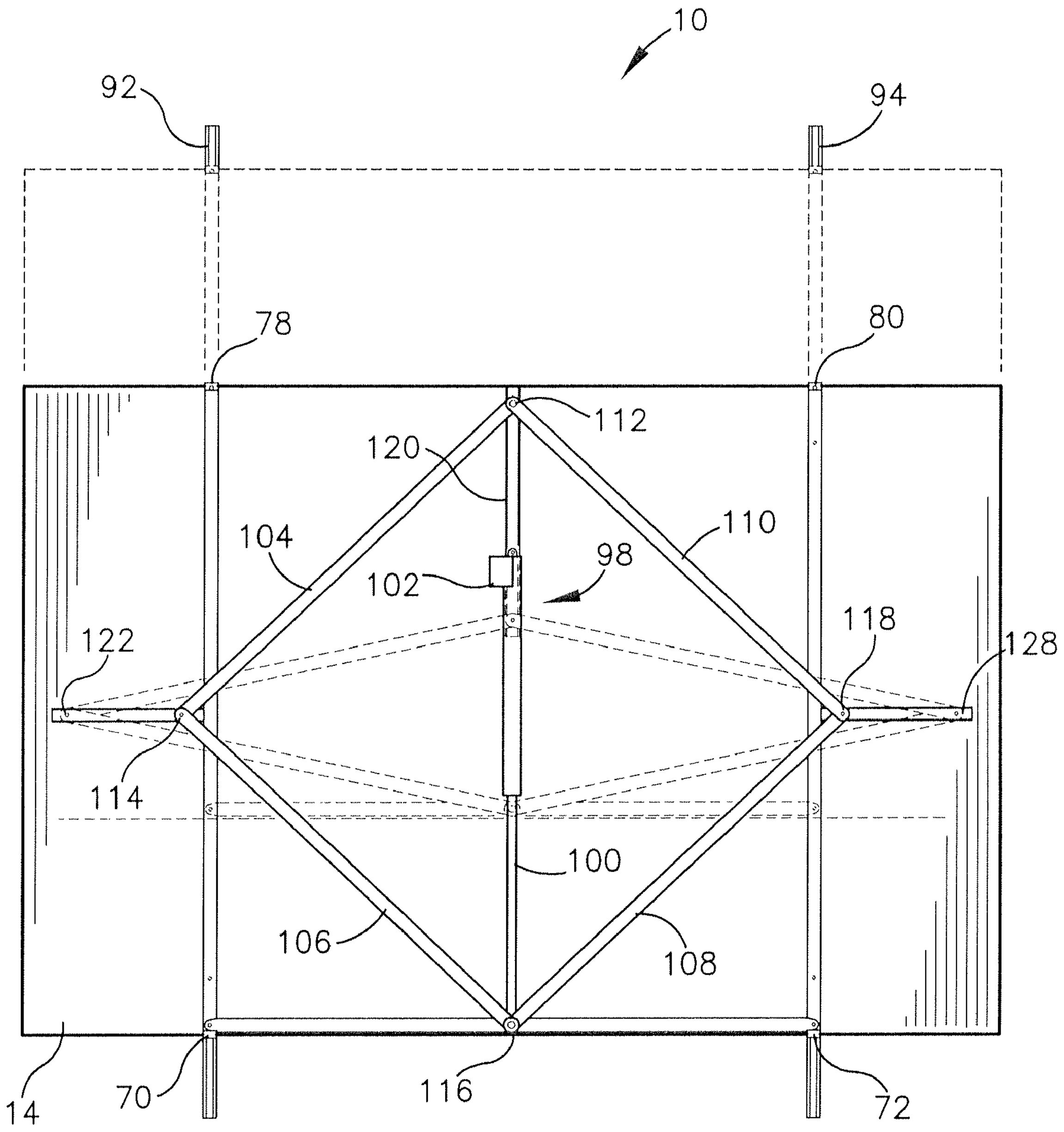
FIG. 6 is a front view of a second embodiment of the adjustable display board system.

As shown in FIGS. 5 and 6, the linear actuator unit 98 may be mounted to the rigid structure 12 such that extension of the actuator rod 100 is in the downward direction. The actuator rod 100 may be coupled to the center of the crosspiece 46, such that the linear actuator unit 98 directly drives the display board 14. Extension of the actuator rod 100 lowers the display board 14, whereas retraction of the rod 100 raises the board 14. The linear actuator unit 98 may also be mounted to the rigid structure 12 such that extension of the actuator rod 100 is in the upward direction, and the actuator rod 100 may be coupled to the top of the display board 14. In this case, extension of the actuator rod 100 raises the display board 14, whereas retraction of the actuator rod 100 lowers the board 14.

The display board system 10 may include first, second, third, and fourth equal length pivot arms 104, 106, 108, 110 pivotally coupled to form a rhombus with first, second, third, and fourth pivot points 112, 114, 116, 118. The pivot arms 104, 106, 108, 110 are generally positioned behind the display board 14. The first, second, third, and fourth pivot points 112, 114, 116, 118 slidably couple to first, second, third, and fourth slider tracks 120, 122, 124, 128, respectively. The slider tracks 120, 122, 124, 128 are mounted to the rigid structure 12 and guide the motion of the pivot points 112, 114, 116, 118. As the display board 14 is raised and lowered, the first and third pivot points 112, 116 move along a vertical line. Thus, the first and third slider tracks 120, 124 are mounted vertically. The second and fourth pivot points 114, 118 move along a horizontal line and accordingly, the second and fourth slider tracks 122, 128 are mounted horizontally. The third pivot point 116 is coupled to the actuator rod 100 and the crosspiece 46 to provide stabilization while raising and lowering the display board 14.

Figure 11:
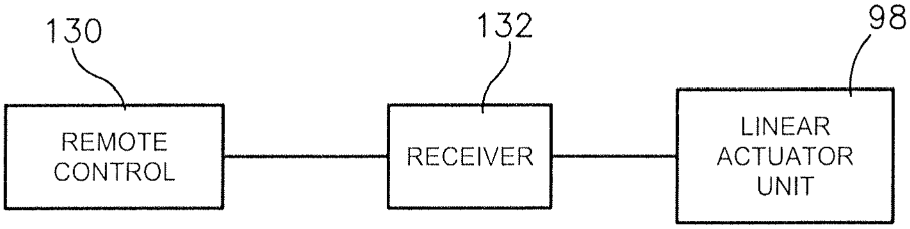
FIG. 11 is a block diagram of the control circuitry utilized in various embodiments of the current invention.

As shown in FIG. 11, the second through the sixth embodiments of the display board system 10 may include a remote control 130 and a receiver 132. A user may generally operate the remote control 130 to transmit commands to raise and lower the display board 14. In some embodiments, the remote control 130 may transmit the commands wirelessly and may be similar to a commonly-known remote control 130 for a television or other electronic device. The remote control 130 may include a radio frequency (RF) transmitter, an infrared (IR) transmitter, or other wireless transmission source. In other embodiments, the remote control 130 may be coupled to the receiver 132 through a cable or wire and may include a keypad, a plurality of switches or knobs, or the like. The remote control 130 may be mounted to the rigid structure 12 in an easily accessible area. The receiver 132 may be coupled to the linear actuator unit 98. The receiver 132 generally receives commands to raise and lower the display board 14 from a user and forwards the commands to the linear actuator unit 98. The receiver 132 may receive commands wirelessly through or infrared transmission or the like. The receiver 132 may include antennas and demodulators or other circuitry to decode frequency modulation (FM) transmissions or similar protocols, as well as sensors or detectors to receive infrared radiation. The receiver 132 may include analog circuitry, digital circuitry, or combinations thereof, as well as microprocessors, microcontrollers, field-programmable gate arrays, or the like.

Figure 7:
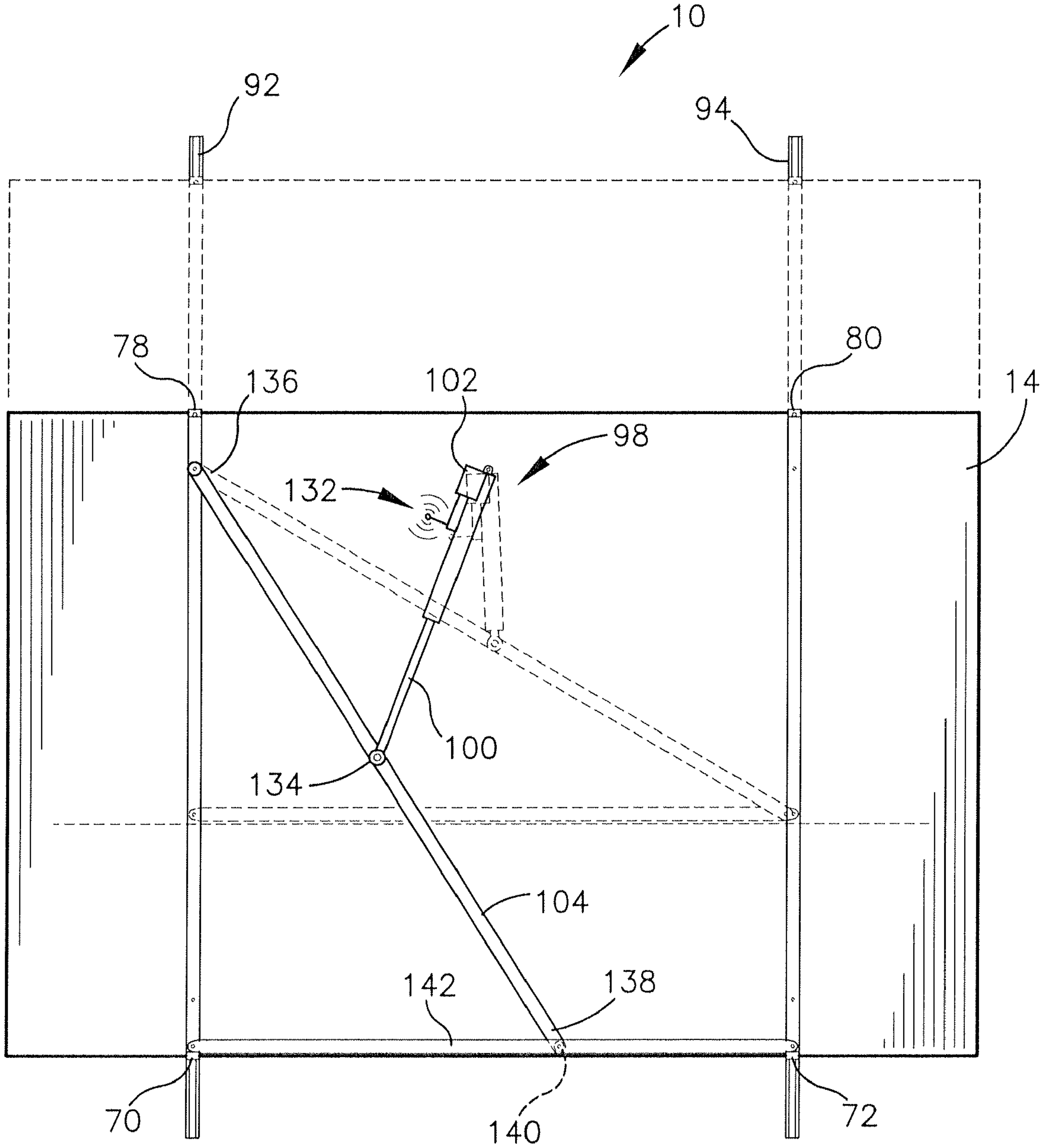
FIG. 7 is a front view of a third embodiment of the adjustable display board system.

A third embodiment of the display board system 10 is illustrated in FIG. 7. The system 10 may comprise the display board 14, the linear actuator unit 98, and a pivot arm 104.

The linear actuator unit 98 may be pivotally mounted to the rigid structure 12, such that the motor drive unit 102 is able to rotate about the pivot point. Accordingly, the actuator rod 100 is able to swing about the pivot point as well. The linear actuator unit 98 may be located on the rigid structure 12 near the top of the display board 14 when the display board 14 is positioned at its lowest point. The actuator rod 100 may include a rod end bearing 134 that is rotatably coupled to the pivot arm 104.

The pivot arm 104 is generally an elongated rigid bar that receives the rod end bearing 134 near the midpoint of the bar and includes a first end 136 that may be rotatably coupled to the rigid structure 12. The first end 136 may be aligned vertically at approximately the same height as the motor drive unit 102 of the linear actuator unit 98. A second end 138 of the pivot arm 104 may include a cam follower bearing 140 that is slidably coupled with a bearing track 142 that is attached horizontally near the bottom of the display board 14 on the rear side. The cam follower bearing 140 may be wheel-shaped with rounded edges and may be attached to the second end 138 of the pivot arm 104 such that the cam follower bearing 140 can rotate about the endpoint. The bearing track 142 is generally a C-shaped channel that is capable of having the cam follower bearing 140 slide or roll within the track.

As the motor drive unit 102 drives the actuator rod 100 to extend, the rod 100 exerts a downward force on the pivot arm 104 forcing it to rotate clockwise about the first end 136 of the pivot arm 104. Upon clockwise rotation of the pivot arm 104, the second end 138 of the pivot arm 104 moves in the downward direction, which in turn, causes the cam follower bearing 140 to slide to the left within the bearing track 142. The downward motion of the second end 138 of the pivot arm 104 and the cam follower bearing 140 also causes downward motion of the display board 14. The actuator rod 100 also tracks the motion of the pivot arm 104 so that as the pivot arm 104 rotates clockwise, the linear actuator unit 98 rotates clockwise as well. Conversely, when the motor drive unit 102 drives the actuator rod 100 to retract, the rod 100 exerts a upward force on the pivot arm 104 forcing it to rotate counterclockwise about the first end 136 of the pivot arm 104. The second end 138 of the pivot arm 104 then moves upward, causing the cam follower bearing 140 to slide to the right within the bearing track 142. The upward motion of the second end 138 of the pivot arm 104 and the cam follower bearing 140 also causes upward motion of the display board 14. Thus, for the third embodiment of the display board system 10, extension of the actuator rod 100 lowers the display board 14 while retraction of the actuator rod 100 raises the display board 14.

As the skilled artisan may be aware, variations in configuration or orientation of the system 10 are possible while still falling within the scope of this embodiment. For example, the linear actuator may be coupled to the pivot arm 104 closer to the point of pivot arm 104 rotation to increase the amount of travel of the display board 14 in the vertical direction relative to the amount of extension of the actuator rod 100. Or the linear actuator unit 98 may be positioned such that extension of the actuator rod 100 raises the display board 14 while retraction of the rod 100 lowers the board 14.

The third embodiment of the display board system 10 may also include the frame 26, the first and second travel guides 92, 94 and the receiver 132 as described above.

Figure 8:
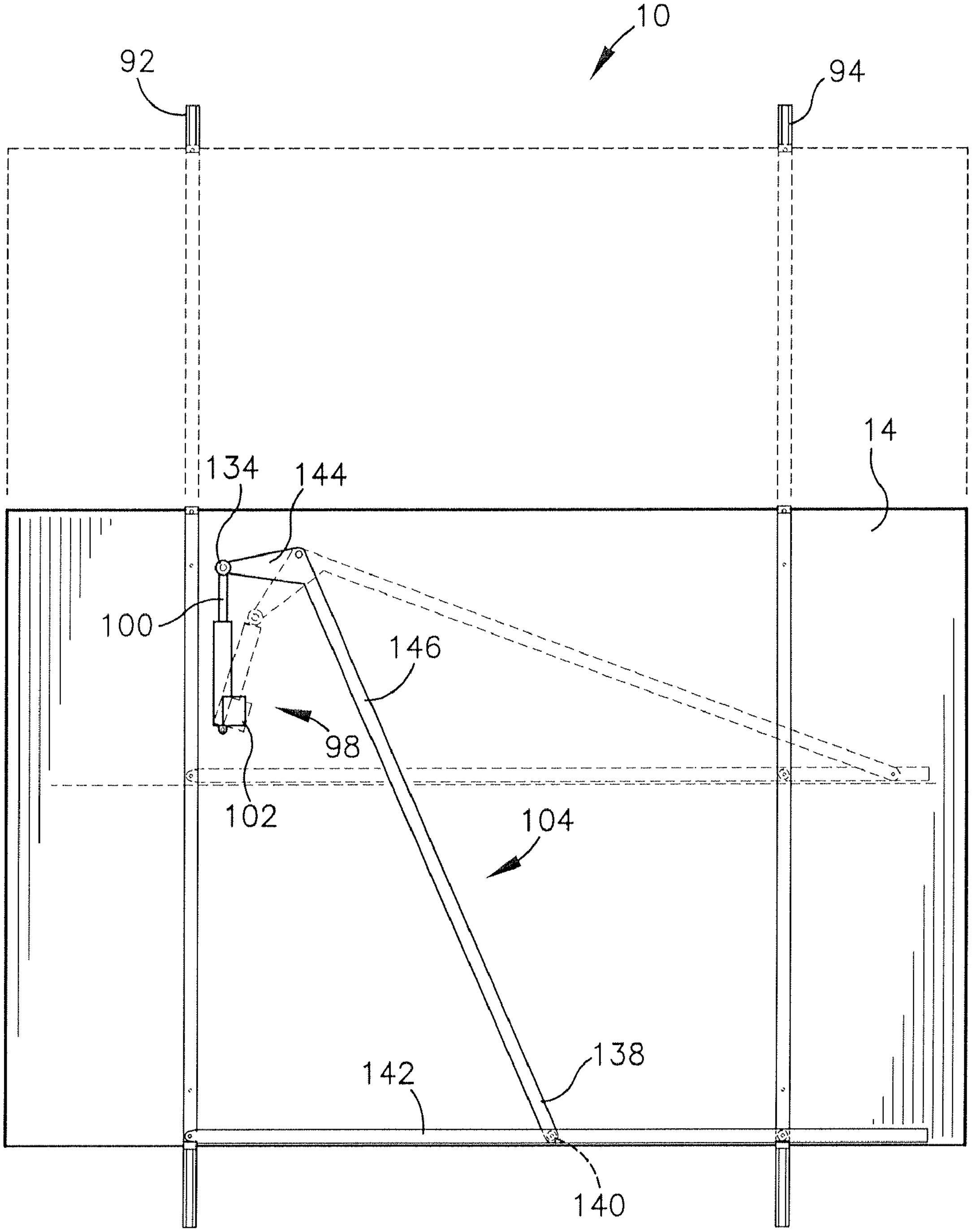
FIG. 8 is a front view of a fourth embodiment of the adjustable display board system.

A fourth embodiment of the display board system 10 is illustrated in FIG. 8. The system 10 may comprise the display board 14, the linear actuator unit 98, and the pivot arm 104.

The system 10 may also include the bearing track 142, which is mounted to the display board 14 as described above. The linear actuator unit 98 may be pivotally attached to the rigid structure 12 as described above, except that the linear actuator unit 98 may be mounted such that extension of the actuator rod 100 is in the upward direction.

The pivot arm 104 may include a lever portion 144 and a bar portion 146 located on opposing ends of the pivot arm 104. The lever 144 and the bar 146 are generally elongated and rigid although the lever 144 is generally much shorter in length than the bar 146. The lever 144 is coupled to the bar 146 at an angle of approximately 118°. The pivot arm 104 is pivotally mounted to the rigid structure 12 such that the lever 144 is positioned on one side of the pivot point and the bar 146 is positioned on the other side of the pivot point. With this orientation, the motion of the lever 144 is counter to the motion of the bar 146. The actuator rod 100 includes the rod end bearing 134 which is rotatably coupled to the free end of the lever 144. The free end of the bar 146 includes the cam follower bearing 140, which is slidably coupled to the bearing track 142.

Operation of the fourth embodiment of the display board system 10 is similar to the third embodiment. As the motor drive unit 102 drives the actuator rod 100 to extend, the rod 100 exerts a upward force on the lever 144 of the pivot arm 104 forcing it to move upward and rotate clockwise about the pivot point of the pivot arm 104. In turn the bar 146 of the pivot arm 104 rotates clockwise and moves downward, causing the cam follower bearing 140 to slide left in the bearing track 142. Downward motion of the bar 146 results in downward motion of the display board 14. The actuator rod 100 also tracks the motion of the pivot arm 104 so that as the pivot arm 104 rotates clockwise, the linear actuator unit 98 rotates clockwise as well. Conversely, retraction of the actuator rod 100 exerts a downward pull on the lever 144 causing it to rotate counterclockwise leading to counterclockwise rotation and upward motion of the bar 146. In turn, the display board 14 moves upward as well. Thus, for the fourth embodiment of the display board system 10, extension of the actuator rod 100 lowers the display board 14 while retraction of the actuator rod 100 raises the display board 14.

Likewise with the third embodiment, variations in configuration and orientation of the system 10 are possible while still falling within the scope of this embodiment. For example, the linear actuator unit 98 may be coupled to the lever 144 closer to the point of pivot arm 104 rotation to increase the amount of travel of the display board 14 in the vertical direction relative to the amount of extension of the actuator rod 100. Or the linear actuator unit 98 may be positioned such that extension of the actuator rod 100 raises the display board 14 while retraction of the rod 100 lowers the board 14.

The fourth embodiment of the display board system 10 may also include the frame 26, the first and second travel guides 92, 94 and the receiver 132 as described above.

Figure 9:
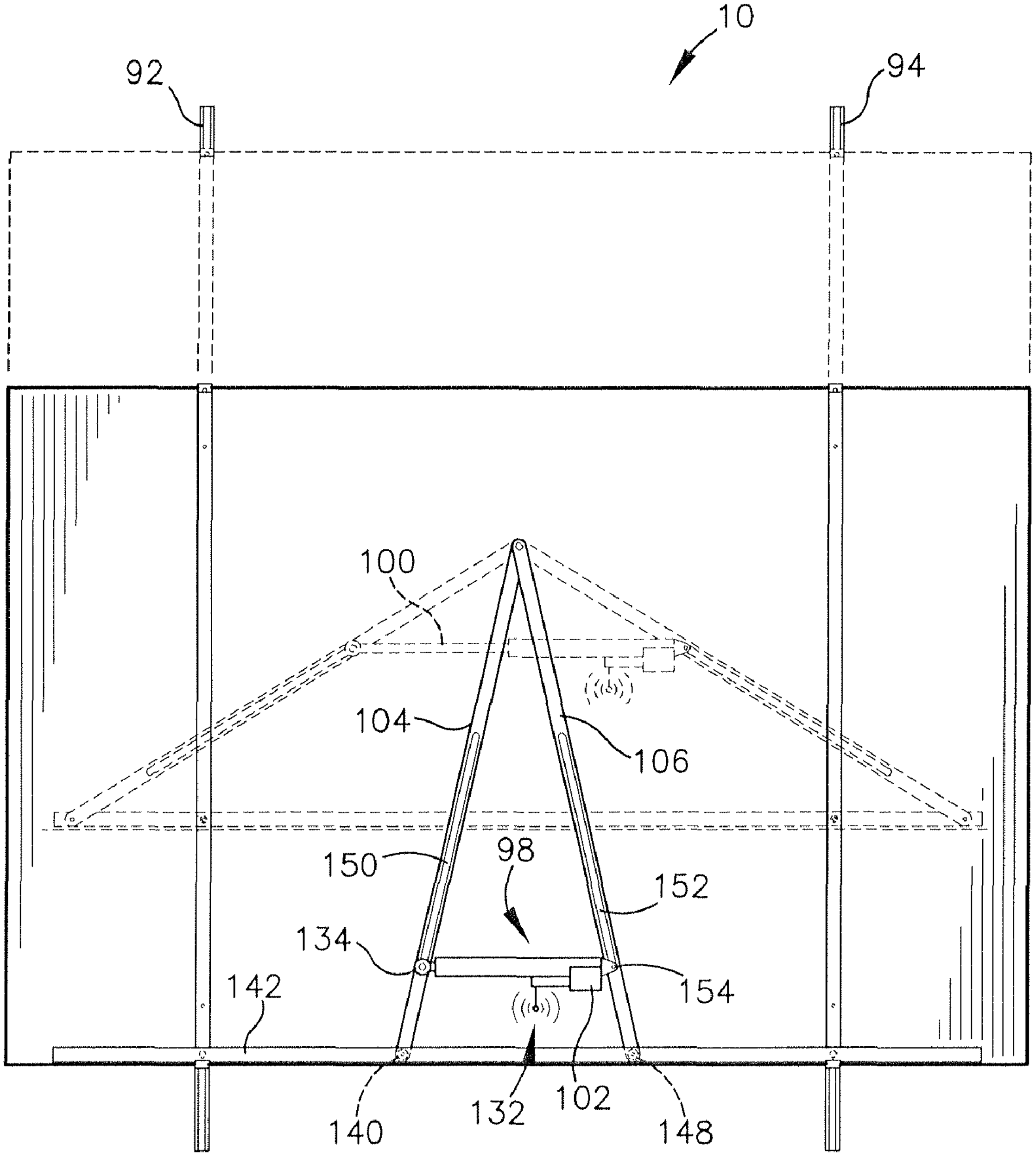
FIG. 9 is a front view of a fifth embodiment of the adjustable display board system.

A fifth embodiment of the display board system 10 is illustrated in FIG. 9. The system 10 may comprise the display board 14, the linear actuator unit 98, and a first pivot arm 104 and a second pivot arm 106. The system 10 may also include the bearing track 142, which is mounted to the display board 14 as described above.

The first and second pivot arms 104, 106 both include a first end 136 that is rotatably coupled to the rigid structure 12. A second end 138 of the first and second pivot arms 104, 106 includes first and second cam follower bearings 140, 148, respectively, which each slide within the bearing track 142, as discussed above. Each pivot arm also includes a pivot arm track 150, 152 that is slidably coupled with the linear actuator unit 98. The track 150 of the first pivot arm 104 is slidably coupled with the actuator rod end bearing 134 and the second pivot arm track 152 is slidably coupled with a bearing 154 attached to the motor drive unit 102.

As the motor drive unit 102 drives the actuator rod 100 to extend, the motor drive unit 102 and the actuator rod 100 exert opposing forces on each other, which in turn push the first and second pivot arms 104, 106 apart from each other. Accordingly, the first and second cam follower bearings 140, 148 slide outward from a central vertical line within the bearing track 142. As the first and second pivot arms 104, 106 separate, the second ends 138 of each arm move in an upward motion, in turn pulling the display board 14 in an upward motion. As the first and second pivot arms 104, 106 are pushed apart, the actuator rod end bearing 134 and the motor drive unit 102 bearing slide upward in the first and second pivot arm tracks 150, 152, respectively. Conversely, when actuator rod 100 retracts, the motor drive unit 102 and the actuator rod 100 exert attracting forces on each other, which in turn pull the first and second pivot arms 104, 106 toward each other. The first and second cam follower bearings 140, 148 slide inward within the bearing track 142. As the first and second pivot arms 104, 106 come together, the second ends 138 of each arm move in a downward motion, in turn pushing the display board 14 in a downward motion. When the first and second pivot arms 104, 106 are pulled together, the actuator rod end bearing 134 and the motor drive unit 102 bearing slide downward in the first and second pivot arm tracks 150, 152, respectively. For the fifth embodiment of the display board system 10, extension of the actuator rod 100 raises the display board 14 while retraction of the actuator rod 100 lowers the display board 14.

Variations in the configuration or orientation of the system 10 are possible while still falling within the scope of this embodiment. For example, the length of the actuator rod 100 could be varied to vary the distance of the vertical motion of the display board 14. The position of the linear actuator unit 98 relative to the first end 136 of the pivot arms 104, 106 could be varied to vary the distance of the vertical travel of the display board 14.

The fifth embodiment of the display board system 10 may also include the frame 26, the first and second travel guides 92, 94 and the receiver 132 as described above.

Figure 10:
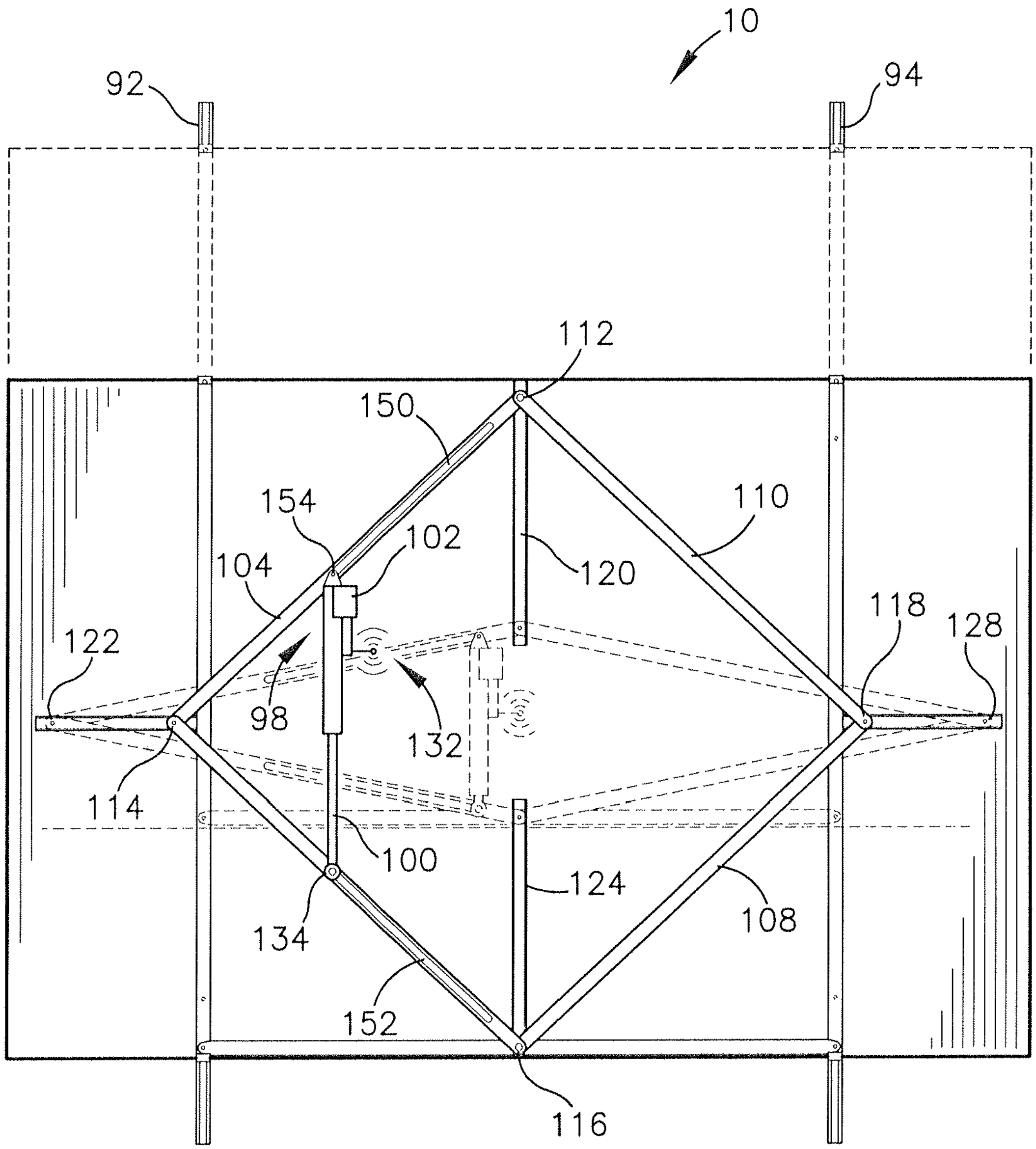
FIG. 10 is a front view of a sixth embodiment of the adjustable display board system.

A sixth embodiment of the display board system 10 is illustrated in FIG. 10. The system 10 may comprise the display board 14, the linear actuator unit 98, a first pivot arm 104, a second pivot arm 106, a third pivot arm 108, and a fourth pivot arm 110.

The structure of the sixth embodiment is similar to the structure of the second embodiment. The first, second, third, and fourth pivot arms 104, 106, 108, 110 may be of equal length and may coupled together to form a rhombus with first, second, third, and fourth pivot points 112, 114, 116, 118. The first, second, third, and fourth pivot points 112, 114, 116, 118 slidably couple to first, second, third, and fourth slider tracks 120, 122, 124, 128, respectively. The slider tracks 120, 122, 124, 128 are mounted to the rigid structure 12 and guide the motion of the pivot points 112, 114, 116, 118. As the display board 14 is raised and lowered, the first and third pivot points 112, 116 move along a vertical line, so accordingly the first and third slider tracks 120, 124 are mounted vertically. The second and fourth pivot points 114, 118 move along a horizontal line, and hence, the second and fourth slider tracks 122, 128 are mounted horizontally. The third pivot point 116 is coupled to the actuator rod 100 and the crosspiece 46 to provide stabilization while raising and lowering the display board 14. The first and second pivot arms 104, 106 also include a pivot arm track 150, 152 that is slidably coupled with the linear actuator unit 98. The track 150 of the first pivot arm is slidably coupled with the actuator rod end bearing 134 and the second pivot arm track 152 is slidably coupled with a bearing 154 attached to the motor drive unit 102.

As the motor drive unit 102 drives the actuator rod 100 to extend, the motor drive unit 102 and the actuator rod 100 exert opposing forces on each other, which in turn push the first and second pivot arms 104, 106 apart from each other, as well as the third and fourth pivot arms 108, 110 apart from each other. The third pivot point 116 moves in a downward motion thereby pushing the display board 14 downward. As the first and second pivot arms 104, 106 spread apart, the linear actuator unit 98 slides along the first and second pivot arm tracks 150, 152 outward away from a central vertical line. Conversely, when actuator rod 100 retracts, the motor drive unit 102 and the actuator rod 100 exert attracting forces on each other, which in turn pull the first and second pivot arms 104, 106 as well as the third and fourth pivot arms 108, 110 toward each other. The third pivot point 116 moves in an upward motion thereby pushing the display board 14 upward. As the first and second pivot arms 104, 106 come together, the linear actuator unit 98 slides along the first and second pivot arm tracks 150, 152 inward toward the center. For the sixth embodiment of the display board system 10, extension of the actuator rod 100 lowers the display board 14 while retraction of the actuator rod 100 raises the display board 14.

Variations in the configuration or orientation of the system 10 are possible while still falling within the scope of this embodiment. For example, the lengths of the pivot arms 104, 106, 108, 110 and the actuator rod 100 may be varied to vary the distance of the vertical travel of the display board 14.

The sixth embodiment of the display board system 10 may also include the frame 26, the first and second travel guides 92, 94 and the receiver 132 as described above.

Various embodiments of the current invention may be also used to provide a height-adjustable apparatus that can support storage elements such as spice racks, dish racks, spare parts racks, medicine cabinets, supply cabinets, and the like. Instead of the display board, the storage element may be attached to the frame, as disclosed above, with perhaps additional fastening components. The system then allows the storage element to be raised and lowered in the same manner as the display board.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An adjustable display board system, the system comprising:

a display board for displaying information;

a first gripper including a plurality of teeth, the first gripper coupled with the left side of the display board;

a second gripper including a plurality of teeth, the second gripper coupled with the right side of the display board;

a first rack including a plurality of teeth complemental to the teeth of the first gripper, the first rack mounted to a rigid structure near the left side of the display board, wherein at least a portion of the first rack teeth engage with the first gripper teeth to prevent downward motion of the display board, but allow upward motion;

a second rack including a plurality of teeth complemental to the teeth of the second gripper, the second rack mounted to the rigid structure near the right side of the display board, wherein at least a portion of the second rack teeth engage with the second gripper teeth to prevent downward motion of the display board, but allow upward motion; and a handle coupled to the first and second grippers, the handle, when pushed, disengaging the first gripper teeth from the first rack teeth and the second gripper teeth from the second rack teeth in order to lower the display board with respect to the first and second racks.

2. The system of claim 1, wherein the display board is raised by pushing upward on the display board, allowing the first and second gripper teeth to slide upward past the first and second rack teeth.

3. The system of claim 1, wherein the teeth of the first gripper and the second gripper and the first rack and the second rack have a generally sawtooth shape, such that each tooth includes a long edge that points in a nearly vertical direction and a short edge that points in a nearly horizontal direction.

4. The system of claim 1, further including a first crosspiece of elongated shape, rotatably coupled to the handle and the first and second grippers, such that when the handle is pushed upward, the first gripper teeth are disengaged from the first rack teeth and the second gripper teeth are disengaged from the second rack teeth.

5. The system of claim 4, further including a first spring coupling the first gripper to the first crosspiece and a second spring coupling the second gripper to the first crosspiece, the first spring and the second spring acting in combination with the first crosspiece to maintain engagement of the first gripper with the first rack and the second gripper with the second rack.

6. The system of claim 1, further including a second crosspiece of elongated shape and installed generally horizontally near the bottom edge and on the rear side of the display board, the second crosspiece coupled to the handle for guiding the handle when it is pushed.

7. The system of claim 1, further including a third crosspiece of elongated shape and installed generally horizontally near the center and on the rear side of the display board, the third crosspiece coupled to the handle and the first and second grippers for guiding the handle when it is pushed.

8. The system of claim 1, further including a first travel guide and a second travel guide, both elongated and mounted vertically to the rigid structure, for guiding the display board as it moves in the vertical direction.

9. The system of claim 8, further including a frame with a first hinged bracket attached to a first vertical bar and a second hinged bracket attached to a second vertical bar, wherein the first hinged bracket and the second hinged bracket are releasably coupled to the display board, the first vertical bar is slidably coupled to the first travel guide, and the second vertical bar is slidably coupled to the second travel guide.

* * * * *